W. C. HEDGCOCK.
CLASP BRAKE.
APPLICATION FILED NOV. 1, 1915.
1,181,385.
Patented May 2, 1916.
2 SHEETS—SHEET 2.
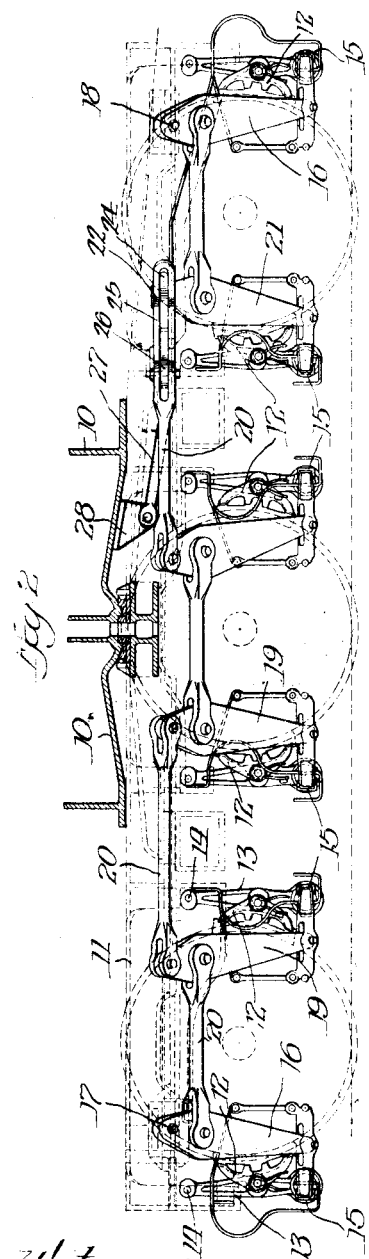
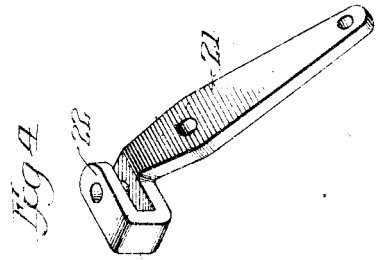
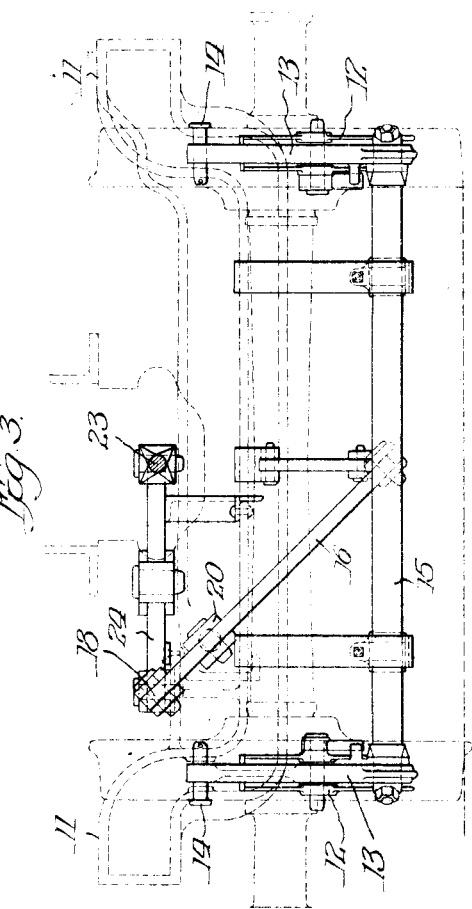

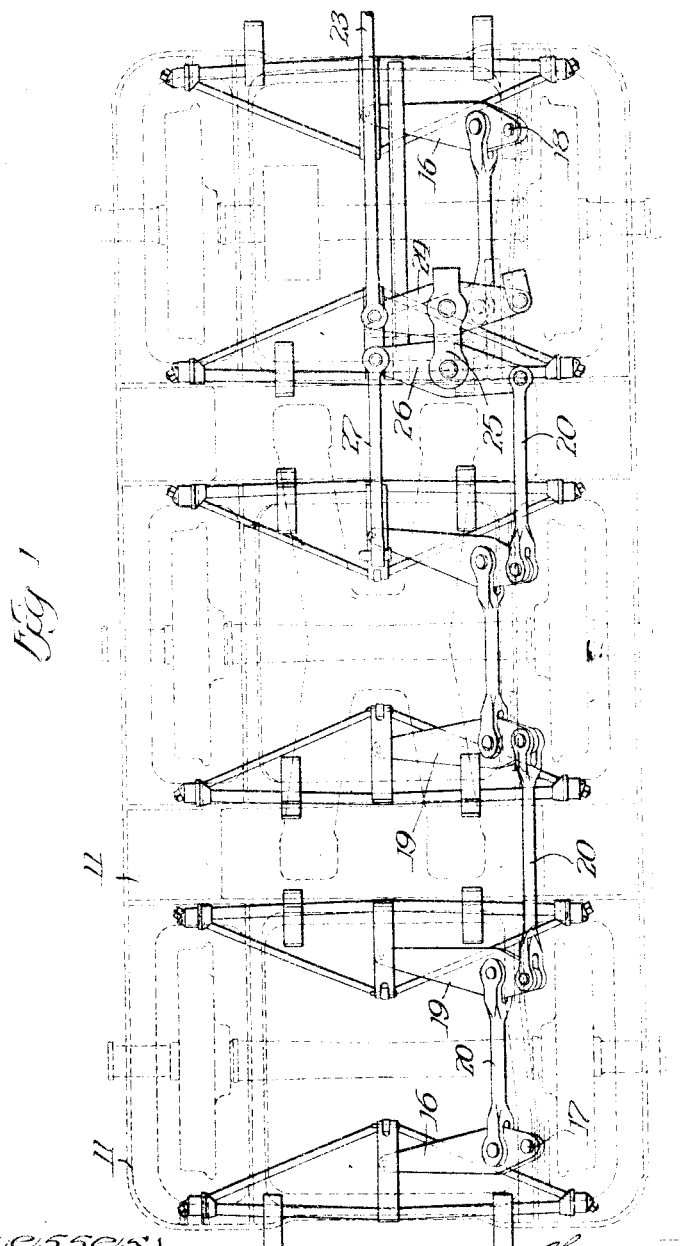

UNITED STATES PATENT OFFICE.

WILLIAM C. HEDGCOCK, OF CHICAGO, ILLINOIS, ASSIGNOR TO AMERICAN STEEL FOUNDRIES, OF NEW YORK, N. Y., A CORPORATION OF NEW JERSEY.

CLASP-BRAKE.

1,181,385.  Specification of Letters Patent.  Patented May 2, 1916.

Application filed November 1, 1915. Serial No. 58,992.

*To all whom it may concern:*

Be it known that I, WILLIAM C. HEDGCOCK, a citizen of the United States, and resident of Chicago, in the county of Cook and State of Illinois, have invented certain new and useful Improvements in Clasp-Brakes, of which the following is a specification.

My invention relates to car brakes, and has particular reference to a novel clasp brake arrangement.

An object in the present invention is to provide a brake arrangement, particularly for six-wheel trucks, wherein the brakes are applied to each side of each wheel and so arranged that the braking force is applied near the horizontal line of the axles. This result is secured by mounting the brake heads upon hanger levers instead of on the end of the beams as is common.

A further object is to provide an arrangement wherein the pull, by means of which the brakes are applied to the wheels, is directed against the car body, to the end that there is no tendency to pull the truck out from under the car. This result is secured by providing a fulcrum at each end of the truck for the dead ends of the levers and a fulcrum on the car body near the center of rotation of the truck. By applying the pull to the brake arrangement at a point near the truck center, an advantageous result is secured, in that the braking force is not changed as the truck passes around a curve.

A further object is to materially reduce the number of parts necessary to a clasp brake arrangement.

The invention will be more readily understood by reference to the accompanying drawings, wherein—

Figure 1 is a plan view of the brake arrangement constructed in accordance with my invention; Fig. 2 is a longitudinal section through a car truck similar to that shown in Fig. 1; Fig. 3 is an end view of the truck, and Fig. 4 is a perspective view of the brake lever at the point of connection between the air brake pull rod and the brake arrangement.

In the drawings the car body is indicated at 10 in Fig. 2, while the truck frame is indicated at 11 in dotted lines in all of the figures. It will be noted that a clasp brake arrangement is contemplated, i. e., one in which the brake shoes 12 are applied to each side of each wheel. The brake shoes are carried on levers 13, pivoted at 14 to the truck frame, the shoes being mounted at a point intermediate the ends of the levers. The usual brake beams 15 are provided, the ends of the beams being mounted in the free ends of the hanger levers 13. Connected to the beams are brake levers 16, the extreme outer levers of the series being fulcrumed to the truck frame at the points 17, 18 respectively. The remaining brake levers 19 are connected to the beams and to each other by the pull rods 20. The force is applied to the brake arrangement by means of the brake lever 21, best shown in Figs. 2 and 4. The upper end of this lever, as best shown in Fig. 4, is bent at an angle, then bent backward upon itself as at 22 to form a pair of jaws which lie in a horizontal position when the brake lever is in its operative position. As best shown in Fig. 1, the air brake pull rod 23 is connected to one end of the floating lever 24, the other end of which lies between the jaws 22 on the lever 21. A link 25 connects the lever 24 to a similar floating lever 26, to one end of which is connected a rod or link 27, which is fulcrumed at 28 to the car body, as best shown in Fig. 2. A link 20 connects the other end of the lever to the brake levers of the adjacent series.

It will be seen by this arrangement that the pull from the air cylinder is against the car body, and there is no tendency to pull the truck out from under the car body. By mounting the brake heads on hanger levers, I am enabled to conserve space, which is very much limited in six-wheel trucks, and, furthermore, am enabled to apply the brakes at a point near the horizontal axis of the wheels.

I claim:

1. In a brake mechanism, the combination of a truck and a car body, levers pivoted to the truck in the vertical plane of the wheels, brake heads mounted on said levers, brake beams connected to the levers at their lower ends, brake levers connected to the beams, the levers at the extreme ends of the trucks being fulcrumed to the trucks, and an additional fulcrum on the car body near its point of connection to the car truck, substantially as described.

2. In a brake arrangement, the combination of a truck mounted beneath a car body, levers pivoted to the truck in the vertical plane of the car wheels and a pair of which is provided for each wheel, a brake head mounted intermediate the ends of each lever, a brake beam connected to the lower ends of each lever, brake levers connected to said beams, the brake levers at the extreme ends of the truck being pivoted to the truck, an air brake pull rod, levers connecting said pull rod to said brake levers, and a dead end provided on the car body for said pull rod connecting levers, substantially as described.

3. In a brake arrangement, the combination of a truck frame and a car body, brake beams provided on each side of each wheel, brake levers connected to the beams and to each other, the brake levers at the extreme ends of the truck being fulcrumed to the truck, an air brake pull rod, an equalizer lever to which said pull rod is connected, said equalizer lever being directly connected to a brake lever, and an equalizer connected to said pull rod lever, one end of said equalizer being fulcrumed to the car body, substantially as described.

4. In a brake arrangement, the combination of a car body and a car truck swiveled thereto, said truck including a truck frame, brake beams provided at each side of each wheel in said truck, a diagonal brake lever connected to each beam, the extreme brake levers being fulcrumed to the truck frame, a horizontal air brake pull rod lever directly connected to one of said brake levers, an equalizer lever connected to said pull rod lever, one end of said equalizer lever being fulcrumed to the car body at a point near its swiveling connection to the truck, substantially as described.

Signed at Chicago, Illinois, this 28th day of October, A. D. 1915.

WILLIAM C. HEDGCOCK.

Witnesses:
J. F. LYNN,
CHAS. GARDNER.